No. 751,244. PATENTED FEB. 2, 1904.
W. E. BANZETT.
COVER FOR COOKING UTENSILS.
APPLICATION FILED OCT. 29, 1902.
NO MODEL.
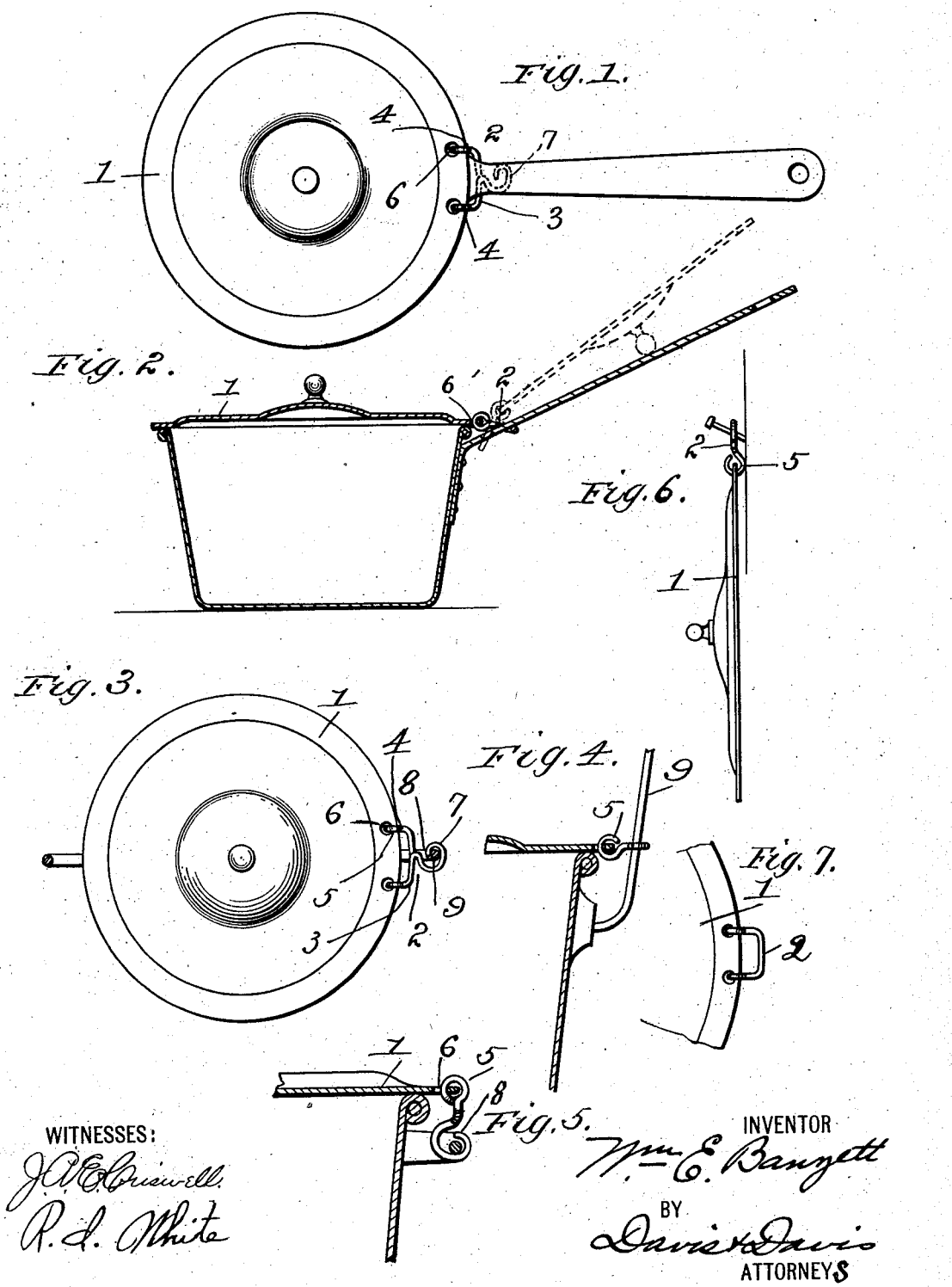
WITNESSES:
INVENTOR
Wm. E. Banzett
BY
Davis & Davis
ATTORNEYS No. 751,244. Patented February 2, 1904.

UNITED STATES PATENT OFFICE.

WILLIAM E. BANZETT, OF NEW YORK, N. Y., ASSIGNOR OF ONE-HALF TO HENRY BANZETT, OF AXTELL, NEBRASKA.

COVER FOR COOKING UTENSILS.

SPECIFICATION forming part of Letters Patent No. 751,244, dated February 2, 1904.

Application filed October 29, 1902. Serial No. 129,313. (No model.)

*To all whom it may concern:*

Be it known that I, WILLIAM E. BANZETT, a citizen of the United States, and a resident of the borough of Brooklyn, county of Kings, city and State of New York, have invented a certain new and useful Improvement in Covers for Cooking Utensils, of which the following is a specification, reference being had therein to the accompanying drawings, in which—

Figure 1 is a plan view of a sauce-pan and the handle thereof, showing my improved cover in position; Fig. 2, a vertical sectional view showing a slightly-different form of connecting-bail; Fig. 3, a plan view showing the form of cover-securing bail illustrated in dotted lines in Fig. 1; Fig. 4, a detail sectional view of the form of device shown in Fig. 3; Fig. 5, a similar view showing a slightly-different form; Fig. 6, a side elevation showing the cover suspended from a nail by means of the connecting device, and Fig. 7 a detail plan view of the form of connecting device shown in Fig. 2.

The object of this invention is to provide covers of cooking utensils with simple means by which they may be detachably connected to the utensils in such manner as to permit them to be freely lifted to disclose the contents of the utensil and to be slightly shifted thereon to facilitate the draining off of the water after the potatoes or other vegetables have sufficiently boiled, and at the same time aid in preventing the said cover from accidentally slipping, as very often happens where the cover is merely held against the utensil by hand alone.

A further object of the invention is to so form this connecting device that it will be adapted for utensils having various forms of handles and that by means of it the cover may be suspended from a nail or hook, the device being connected to the edge of the cover for this purpose.

Referring to the various parts by numerals, 1 designates the cover of the utensil, which is formed with the flat part 1ª at its edge, and 2 the connecting-device which, as shown in Fig. 1, consists of a wire bail comprised of a main part 3 and parallel end portions 4, these end portions being bent to form the eyes 5, which engage perforations 6 in the flat part 1ª of the cover, near the outer edge thereof. The bail swings loosely in the eyes 5. This form of connecting device is especially adapted for use on cooking utensils having the usual long rigid handles. In use the bail is first engaged under the handle, as shown in Fig. 1, and, as will be readily seen, permits the cover to be lifted and turned back on the handle to disclose the contents of the utensil, or it may be shifted laterally slightly off the utensil and readily held in that position while draining the water or other liquid contained in the utensil. It is obvious that this bail will aid materially in preventing the cover slipping laterally from the utensil during this draining operation. When the cover is turned back onto the handle, as shown in dotted lines in Fig. 2, it forms a shield which effectually protects the hand grasping the handle of the utensil from the steam which may arise from the contents of the utensil.

To adapt the connecting means for utensils having pivoted or swinging handles secured to their sides, instead of the long rigid handles, as shown in Figs. 1 and 2, the main portion of the bail is formed into the outward-extending hook 7, the end of which is inturned, as at 8, to enable it to embrace the bail-handle 9 of the utensil, this inturned end materially aiding in preventing the accidental detachment of the bail from the handle.

In order to adapt the connecting device for utensils having horizontal handles, as shown in Fig. 5, the hook 7 is bent at right angles to the main part 3.

In Figs. 2 and 7 is shown a bail without the hook 7. This form of connecting is adapted for use in utensils having rigid handles, such as is shown in Fig. 1.

It will be noted that when the connecting device is used, as shown in Figs. 3 and 4, it will also permit the cover to be readily lifted or to be shifted laterally to one side, as described with respect to the use of the device as shown in Figs. 1 and 2. It will be also noted that the connecting device may be used as a suspending means by which the covers can be hung on a nail or hook, as desired. This is a great advantage, it being practically impossible to hang up the ordinary covers.

It will be thus seen that a very simple attaching device is provided and that said device may be applied to the ordinary covers now in use and that when applied it may be used or not, as desired. If it is desired to use the cover without connecting it to the handle of the utensil by means of the connecting device, said device may be swung over on the top of the cover and there will be entirely out of the way and will not in the least interfere with the ordinary uses of the cover.

Having thus described my invention, what I claim as new, and desire to secure by Letters Patent, is—

1. A cover for cooking utensils formed with two apertures spaced a suitable distance apart and located near the edge thereof, and a bail formed with two parallel end portions each of which is formed into an eye engaging one of the apertures in the cover, and a main portion connecting the end portions and extending at substantially right angles thereto and adapted to lie beyond the edge of the cover whereby said main portion may be engaged over the handle of a cooking utensil and may be used as a suspending means, and an outward-extending hook formed integral with said main portion substantially midway between the end portions, and an inturned end 8 formed on said hook portion, substantially as described and for the purpose set forth.

2. The combination of a cover, and a bail, said bail comprising two end portions, means for pivotally connecting said end portions to the cover near the edge thereof, a main portion connecting the end portions of said bail, said main portion being adapted to lie beyond the edge of the cover whereby it may be engaged over the handle of a cooking utensil and may be used as a suspending means, and an outward-extending hook formed integral with said main portion substantially midway between the end portions, substantially as described and for the purpose set forth.

In testimony whereof I hereunto affix my signature, in the presence of two witnesses, this 27th day of October, 1902.

WILLIAM E. BANZETT.

Witnesses:
 FREDERICK A. BUNN,
 WM. R. DAVIS.